US011727822B2

(12) United States Patent
Besana et al.

(10) Patent No.: US 11,727,822 B2
(45) Date of Patent: Aug. 15, 2023

(54) METHOD FOR GUIDING INSTALLATION OF INTERNAL ACCESSORY DEVICES IN LOW VOLTAGE SWITCHES

(71) Applicant: ABB S.p.A., Milan (IT)

(72) Inventors: Stefano Gerolamo Besana, Capriate San Gervasio (IT); Gabriele Perrone, Milan (IT)

(73) Assignee: ABB S.p.A., Milan (IT)

( * ) Notice: Subject to any disclaimer, the term of this patent is extended or adjusted under 35 U.S.C. 154(b) by 631 days.

(21) Appl. No.: 16/781,329

(22) Filed: Feb. 4, 2020

(65) Prior Publication Data

US 2020/0265743 A1    Aug. 20, 2020

(30) Foreign Application Priority Data

Feb. 14, 2019  (EP) ..................................... 19157291

(51) Int. Cl.
*G09B 19/00*  (2006.01)
*G06T 11/00*  (2006.01)
(Continued)

(52) U.S. Cl.
CPC ............ *G09B 19/003* (2013.01); *G06T 11/00* (2013.01); *G06V 20/20* (2022.01); *G09B 5/02* (2013.01); *H01H 11/00* (2013.01)

(58) Field of Classification Search
CPC ........ G09B 19/003; G09B 5/02; G06V 20/20; H01H 11/00; G06T 11/00
See application file for complete search history.

(56) References Cited

U.S. PATENT DOCUMENTS 7,713,072 B2 *  5/2010  Azzola ................... H01H 73/08
                                                             439/119
7,961,480 B2 *  6/2011  Besana .............. H01H 71/0228
                                                             174/64
(Continued)

FOREIGN PATENT DOCUMENTS

EP        2662879 A1 *  11/2013  ......... H01H 71/0271
WO  WO-2006120147 A1 *  11/2006  ......... H01H 71/0228

OTHER PUBLICATIONS

European Patent Office, Extended Search Report issued in corresponding Application No. 19157291.6, dated Jul. 19, 2019, 5 pp.
(Continued)

*Primary Examiner* — Xuan M Thai
*Assistant Examiner* — Sadaruz Zaman
(74) *Attorney, Agent, or Firm* — Armstrong Teasdale LLP

(57) ABSTRACT

A method for guiding installation of an accessory device in a low voltage switching device having one or more mounting locations for one or more accessory devices using guided mounting means including an image acquisition device, a display, and processing means executing a guided mounting program for guiding installation of the accessory device in the low voltage switching device. The method includes: acquiring an image of the low voltage switching device and displaying it on the display; identifying the low voltage switching device; displaying in an augmented reality view one or more points of interest of the low voltage switching device by superimposing possible accessory device mounting locations to the image of the low voltage switching device; displaying information concerning possible accessory devices installable in the low voltage switching device; selecting one of the possible accessory devices and identifying in an augmented reality view one or more possible mounting locations of the selected accessory device in the low voltage switching device or selecting one of the possible (Continued)

accessory device mounting locations and identifying in an augmented reality view one or more accessory devices installable in the selected mounting location; and displaying information concerning a mounting procedure of a selected accessory device in a selected mounting location of the low voltage switching device.

19 Claims, 15 Drawing Sheets

(51) Int. Cl.
    *G09B 5/02*     (2006.01)
    *H01H 11/00*     (2006.01)
    *G06V 20/20*     (2022.01)

(56) References Cited

U.S. PATENT DOCUMENTS

| | | | | |
|---|---|---|---|---|
| 8,232,489 | B2* | 7/2012 | Frassineti | H01H 71/04 |
| | | | | 200/310 |
| 8,358,188 | B2* | 1/2013 | Bellotto | H01H 71/7409 |
| | | | | 335/202 |
| 8,471,162 | B2* | 6/2013 | Scola | H01H 71/465 |
| | | | | 200/303 |
| 9,407,071 | B2* | 8/2016 | Degli Innocenti | |
| | | | | H01H 71/0271 |
| 10,380,911 | B2* | 8/2019 | Hsu | B23K 9/32 |
| 11,132,479 | B1* | 9/2021 | Tyson, II | G05B 19/41805 |
| 11,533,228 | B2* | 12/2022 | Liu | H04L 41/0253 |
| 11,552,500 | B2* | 1/2023 | Rao | H02J 13/00002 |
| 2005/0200333 | A1* | 9/2005 | Khau | B60R 16/03 |
| | | | | 320/132 |
| 2007/0194869 | A1 | 8/2007 | Titus | |
| 2008/0180932 | A1* | 7/2008 | Besana | H01H 71/0228 |
| | | | | 361/837 |
| 2009/0239399 | A1* | 9/2009 | Azzola | H01H 73/08 |
| | | | | 335/8 |
| 2014/0029167 | A1* | 1/2014 | Degli Innocenti | H02B 1/26 |
| | | | | 361/615 |
| 2015/0193982 | A1 | 7/2015 | Mihelich et al. | |
| 2016/0188763 | A1 | 6/2016 | Beiner | |
| 2017/0213390 | A1* | 7/2017 | Ramachandran | G06F 3/03547 |
| 2020/0265743 | A1* | 8/2020 | Besana | H01H 71/0228 |

OTHER PUBLICATIONS

India Patent Office, Examination report issued in corresponding Application No. 202044005823, dated Oct. 26, 2021, 6 pages.

\* cited by examiner

METHOD FOR GUIDING INSTALLATION OF INTERNAL ACCESSORY DEVICES IN LOW VOLTAGE SWITCHES

The present invention relates to a method for guiding a user during a procedure of installation of one or more accessory device inside a low voltage switching device.

It is known that low voltage switching devices, such as for example circuit breakers, disconnectors, contactors, limiters, hereinafter commonly referred to as switches for reasons of brevity, generally comprise a casing and one or more electrical poles, associated to each of which there is at least one pair of contacts that can be coupled to and uncoupled from one another. Switches of the known art also comprise control means that cause relative movement of said pairs of contacts so that they can assume at least one first, coupling, position (circuit closed) and one second, separation, position (circuit open).

It is also known that low voltage switching devices can be equipped, according to the needs, with a number of accessory devices, such as alarm and auxiliary contact systems, shunt trip, undervoltage tripping devices and similar auxiliary devices, that can be housed in dedicated location inside the casing of the low voltage switch.

Due to the high number of accessory devices and their possible combination, the low voltage switches are normally sold without preassembled auxiliary devices, whose installation inside the switch is usually carried out by an installation technician once the final configuration is decided. Moreover, it may happen that, when a low voltage switch is already installed, it may be desirable to change or upgrade its configuration by changing/adding/removing one or more accessory devices.

For these reasons, the low voltage switches are normally provided with a number of mounting locations for a number of different accessory devices. In order to help the operator to identify the various mounting locations and to properly couple them with a corresponding accessory device, the points of interest for installation inside the casing of the low voltage switch are normally marked with signs or colors which identify one or more accessory devices suitable to be installed in that specific mounting location. Separated instructions (e.g., a printed manual or a PDF file) are normally needed to specify the proper combination of signs/colors with one or more corresponding accessory devices and to give the operator the installation instructions.

However, the known solution, even if suitable for the needs, have a number of drawbacks and disadvantages.

For instance, once the low voltage switches have been already produced it is impossible, or at least cumbersome, to change or update the signs/colors marked on them.

Moreover, particularly when there is a high number of mounting locations and accessory devices potentially installable, it's difficult to codify complicated combinations of accessory devices so that they can match the signs/colors marked on the mounting locations of the low voltage switch. In general, the need of taking into account all possible configurations of the low voltage switches, and consequently all possible combinations of accessory devices installable inside them, complicates the production and/or installation operations, thereby increasing the production and/or installation operations.

On the basis of the above considerations, there is clearly a need to have available alternative technical solutions that will enable the limits and the problems set forth above to be overcome.

Hence, the present disclosure is aimed at providing a method for guiding installation of an accessory device in a low voltage switching device, which allows overcoming at least some of the above-mentioned shortcomings.

In particular, the present invention is aimed at providing a method for guiding installation of an accessory device in a low voltage switching device, which is able to simplify the installation procedures of accessory devices in low voltage switches.

Furthermore, the present invention is aimed at providing a method for guiding installation of an accessory device in a low voltage switching device, which allows to easily provide a low voltage switch with the desired accessory devices.

Moreover, the present invention is aimed at providing a method for guiding installation of an accessory device in a low voltage switching device, which is able to reduce the assembly times of the accessory devices inside the casing of a low voltage switch.

Furthermore, the present invention is aimed at providing a method for guiding installation of an accessory device in a low voltage switching device, that avoids or reduces at a minimum possible mistakes by an operator during the assembly of an accessory device inside the casing of a low voltage switch.

Moreover, the present invention is aimed at providing a method for guiding installation of an accessory device in a low voltage switching device, which allows an operator to easily identify the mounting locations of accessory devices inside the casing of the low voltage switch and to match them with one or more corresponding specific accessory devices.

Also, the present invention is aimed at providing method for guiding installation of an accessory device in a low voltage switching device, that is reliable and relatively easy to be carried out and at competitive costs.

Thus, the present invention relates to a method for guiding installation of an accessory device in a low voltage switching device having one or more mounting locations for one or more accessory devices using guided mounting means comprising an image acquisition device, a display, and processing means executing a guided mounting program for guiding installation of said accessory device in said low voltage switching device. The method according to the present invention is characterized in that it comprises the steps of:
  acquiring an image of said low voltage switching device and displaying it on said display;
  identifying said low voltage switching device;
  displaying in an augmented reality view one or more points of interest of said low voltage switching device by superimposing possible accessory device mounting locations to the image of said low voltage switching device;
  displaying information concerning possible accessory devices installable in said low voltage switching device;
  selecting one of said possible accessory devices and identifying in an augmented reality view one or more possible mounting locations of the selected accessory device in the low voltage switching device or selecting one of said possible accessory device mounting locations and identifying in an augmented reality view one or more accessory devices installable in the selected mounting location;
  displaying information concerning a mounting procedure of a selected accessory device in a selected mounting location of said low voltage switching device.

As better explained in the following description, in the method of the present invention, the use of processing means executing a guided mounting program based on augmented reality, allows to avoid, or at least greatly reduce, the above-mentioned problems.

In practice, once the image of the low voltage switch is acquired and displayed on the display, the guided mounting program identify the low voltage switch and superimpose to its image a view of the possible mounting locations of accessory devices. The user is then guided in selecting a proper combination of accessory devices and corresponding mounting locations—based, e.g., on information stored in said processing means—in order to achieve the desired final configuration of the low voltage switch.

It is worth noting that the method of the present invention can be carried out with relative simple and cheap equipment, such as normally used smart devices (e.g. smart phones or tablets), and it is therefore very cost effective.

In a typical embodiment of a method for guiding installation of an accessory device in a low voltage switching device according to the present invention, said processing means typically comprises a processor and a memory device storing said guided mounting program for execution by said processor and data concerning said low voltage switching device and said one or more accessory devices usable by said guided mounting program. As previously said, the mounting program is relatively simple and the amount of data stored is relatively reduced, and therefore the guided mounting program can be easily executed by the processing means normally available in a conventional smart device.

In a particular embodiment of a method for guiding installation of an accessory device in a low voltage switching device according to the present invention, said step of identifying said low voltage switching device comprises identifying and tracking said low voltage switching device in case of relative movement between said low voltage switching device and said image acquisition device.

According to a typical embodiment of the method of the present invention, said step of displaying in an augmented reality view one or more points of interest of said low voltage switching device comprises superimposing 2D or 3D views of said possible accessory device mounting locations to the image of said low voltage switching device.

In a particular embodiment of a method for guiding installation of an accessory device in a low voltage switching device according to the present invention, said step of displaying in an augmented reality view one or more points of interest of said low voltage switching device comprises identifying in an augmented reality view free mounting locations and/or already-occupied mounting locations of said accessory device in said low voltage switching device. In other words, according to this embodiment, when the low voltage switch is already equipped with one or more accessory devices, the user is immediately presented with information concerning mounting locations still available for the installation of one or more further accessory devices.

In a first general embodiment of a method for guiding installation of an accessory device in a low voltage switching device according to the present invention, said step of selecting one of said possible accessory devices and identifying one or more possible mounting locations of the selected accessory device in the low voltage switching device further comprises the step of selecting a desired mounting location for the selected accessory device. In practice, according to this embodiment, the mounting procedures foresees in first place the selection of a desired accessory device and in second place the selection of a corresponding mounting location for that specific accessory device.

In a second alternative general embodiment of a method for guiding installation of an accessory device in a low voltage switching device according to the present invention, said step of selecting one of said possible accessory device mounting locations and identifying one or more accessory devices installable in the selected mounting location further comprises the step of selecting a desired accessory device for the selected mounting location. In practice, according to this embodiment, the mounting procedures foresees in first place the selection of a desired mounting location inside the low voltage switch and in second place the selection of a corresponding accessory device for installation in that specific mounting location.

A further general embodiment of a method for guiding installation of an accessory device in a low voltage switching device according to the present invention, further comprises the step of displaying information concerning the selected accessory device.

It is worth noting that the method of the present invention is very flexible since it allows presenting to the user all possible combinations of accessory devices and their locations in the low voltage switch.

In other words, since one or more mounting locations can house a number of different accessory devices, in a particular embodiment of a method for guiding installation of an accessory device in a low voltage switching device according to the present invention, such method further comprises the step of displaying a plurality of combinations between accessory devices and mounting locations thereof inside the low voltage switch.

Once the desired combination of accessory device and mounting location has been selected, the method for guiding installation of an accessory device in a low voltage switching device of the invention conveniently comprises the step of selecting a method of displaying said information concerning a mounting procedure of a selected accessory device in a selected mounting location of said low voltage switching device.

In practice, for a chosen combination of accessory device and mounting location the user can select how to display the corresponding mounting instructions, e.g., with a video or images or a PDF file or by means of any augmented reality procedure.

The hardware requirements for carrying out the method of the present invention are relatively simple. In practice, the guided mounting means can conveniently consist in a conventional smart device (e.g. a smart phone or a tablet or smart wearable device) including a camera, a display, and processing means running an application that guides a user during installation of an accessory device in a low voltage switching device Further features and advantages of the present invention will be more clear from the description of preferred but not exclusive embodiments of the method for guiding installation of an accessory device in a low voltage switching device of the present invention, shown by way of examples in the accompanying drawings, wherein:

Figure 1:
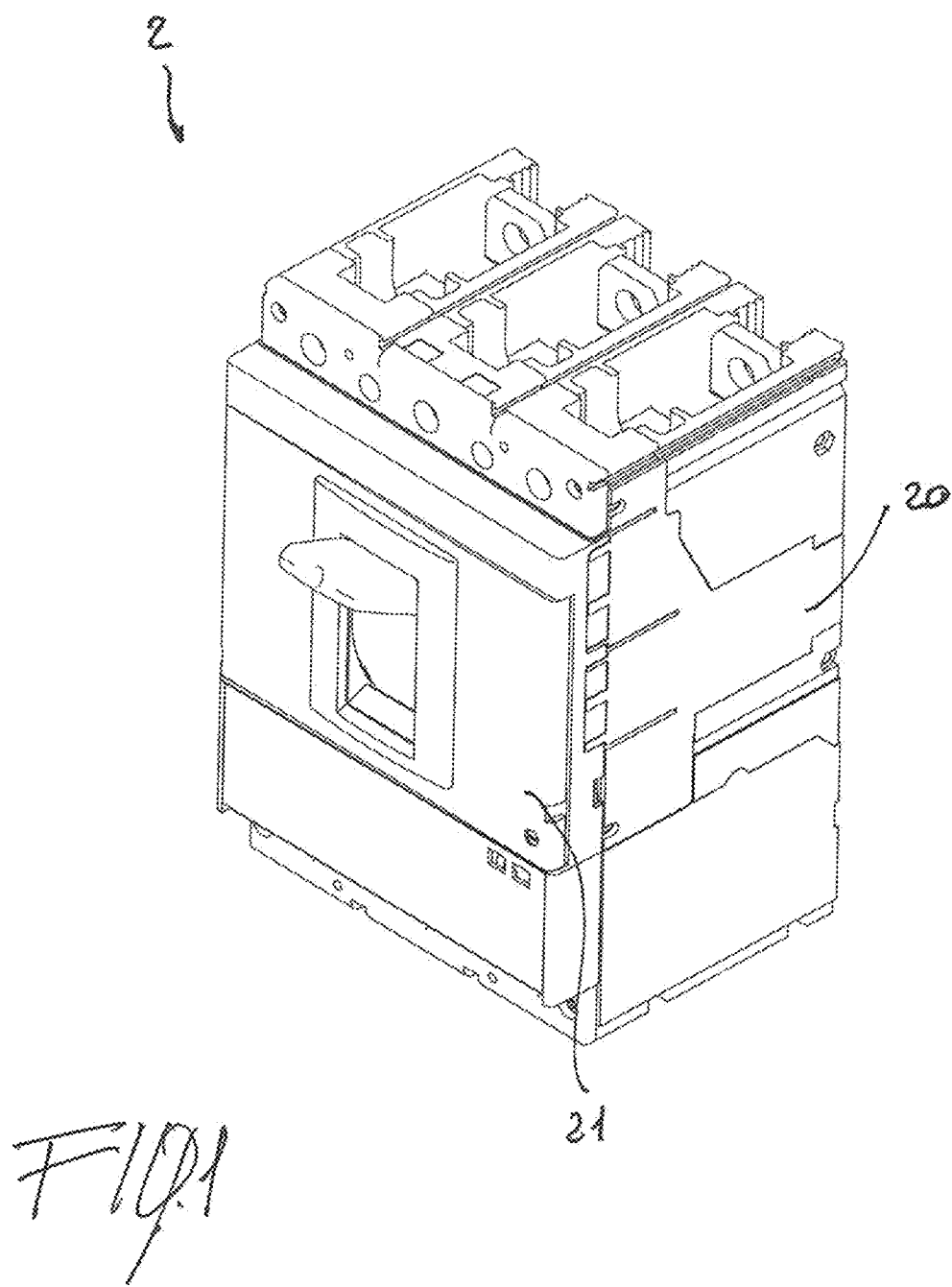
FIG. 1 is a perspective view of a low-voltage switching device in which the method of the present invention can be used.
Figure 2:
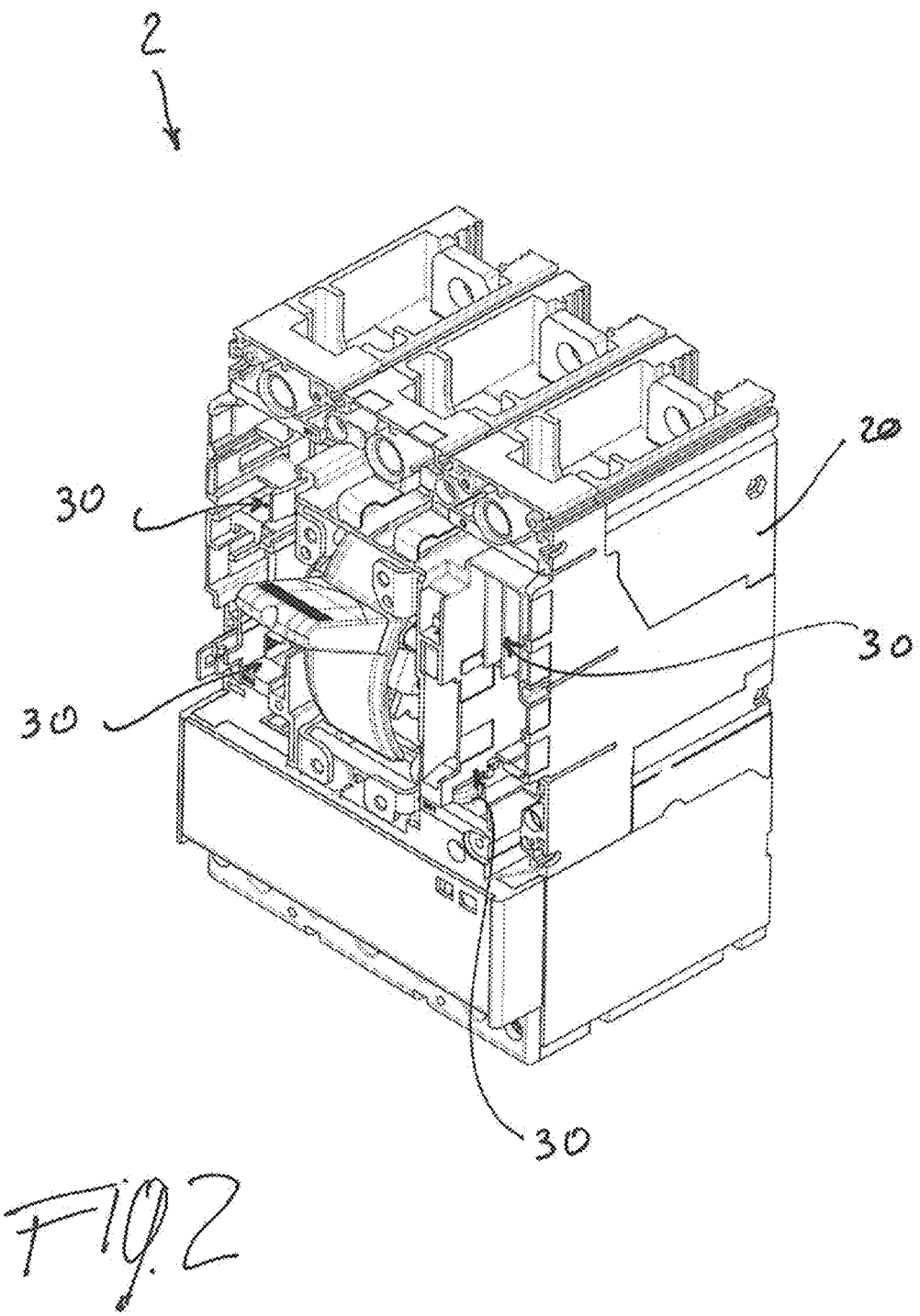
FIG. 2 is a perspective view the low-voltage switching device of FIG. 1 with the cover removed to show the internal mounting locations of accessory devices.

In the attached figures, the method of the present invention is described with reference to a low voltage circuit breaker 2, e.g. a molded case circuit breaker. With reference to FIG. 1, the circuit breaker 2 normally comprises a casing 20 with a front cover 21. As shown in FIG. 2 in which the cover 20 has been removed, a number of mounting locations 30 are provided inside the casing 20 for housing a number of accessory devices according to the desired configuration of the circuit breaker. Circuit breaker, and in general low voltage switching devices, and accessory devices can be of conventional type and will not be described in further details.

The method of the present invention is carried out by using guided mounting means which in the attached figures are represented by a smart device, i.e. a smart phone 40 of conventional type.

The smart phone 40 normally comprising an image acquisition device, e.g. a built-in camera, a display 41, and processing means which can execute a guided mounting program for guiding the installation of an accessory device 1 in the low voltage circuit breaker 2.

In a preferred embodiment of the method for guiding installation of an accessory device 1 according to the invention, the processing means comprises a processor and a memory device storing said the mounting program so that it can be executed by said processor. The memory device also stores data concerning the low voltage switching device 2 and data concerning said one or more accessory devices 1, which data are usable by said guided mounting program.

In other words, the processor of the smart device 40 execute an application stored in its memory that guides a user during installation of an accessory device 1 in the low voltage circuit breaker 2, based on data concerning the circuit breaker 2 and the accessory device 1 also stored in the memory of the smart device 40.

Figure 3:
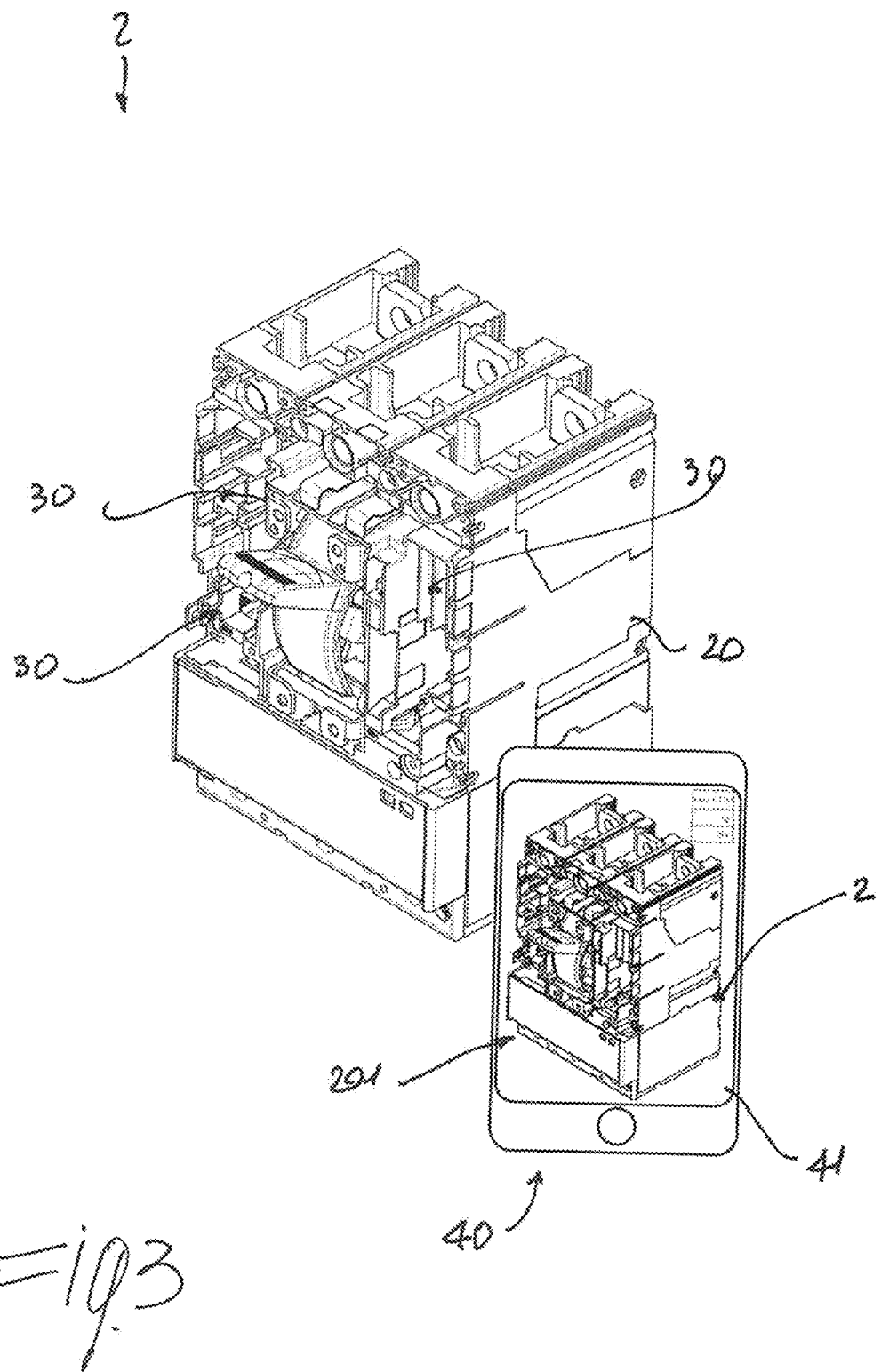
FIG. 3 is a perspective view the low-voltage switching device of FIG. 2 shown together with a smart device (i.e. a smart phone) usable in the method of the present invention.
Figure 4:
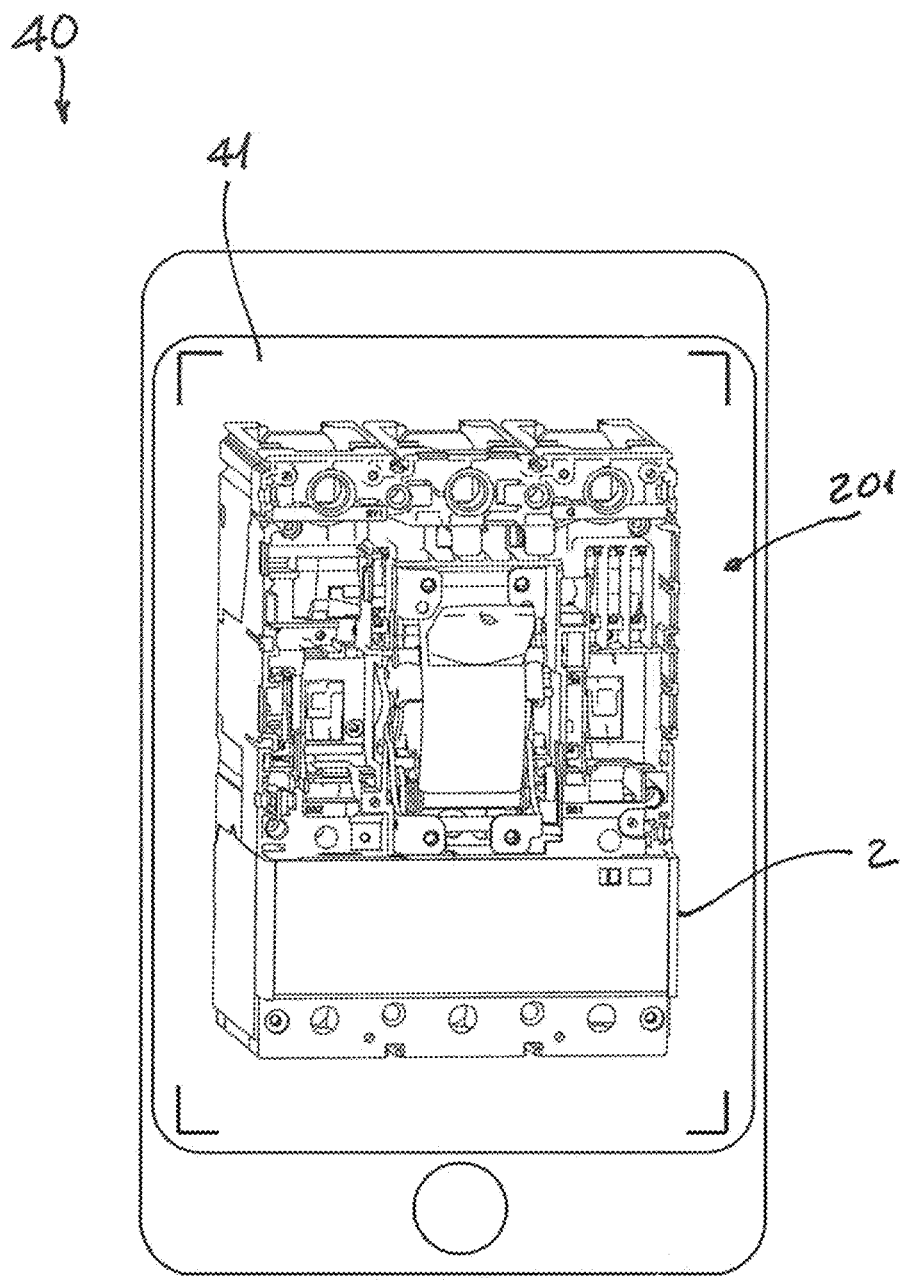
FIGS. 4-13 show different steps of the method of the present invention as displayed on the display a smart device (i.e. a smart phone)

Once the application is started and the image 201 of the low voltage circuit breaker 2 has been acquired by the camera, said image 201 is displayed on the display 41 of the smart device 40 (steps 100 and 200) and the low voltage circuit breaker 2 is properly identified (FIGS. 3, 4).

In a particular embodiment of the method for guiding installation of an accessory device 1 in a low voltage switching device 2 of the present invention, not shown in the attached figure, the processing means are conveniently adapted to carry out not only identification of said low voltage switching device 2, but also identification and tracking of said low voltage switching device 2, which is particularly useful in case of relative movement between said low voltage switching device 2 and said image acquisition device.

Once the low voltage circuit breaker 2 has been identified and displayed on the display 41, the method of the present inventions foresees the use of augmented reality functions to present on the display 41 in an augmented reality view one or more points of interest of said low voltage circuit breaker 2 (step 300).

Figure 5:
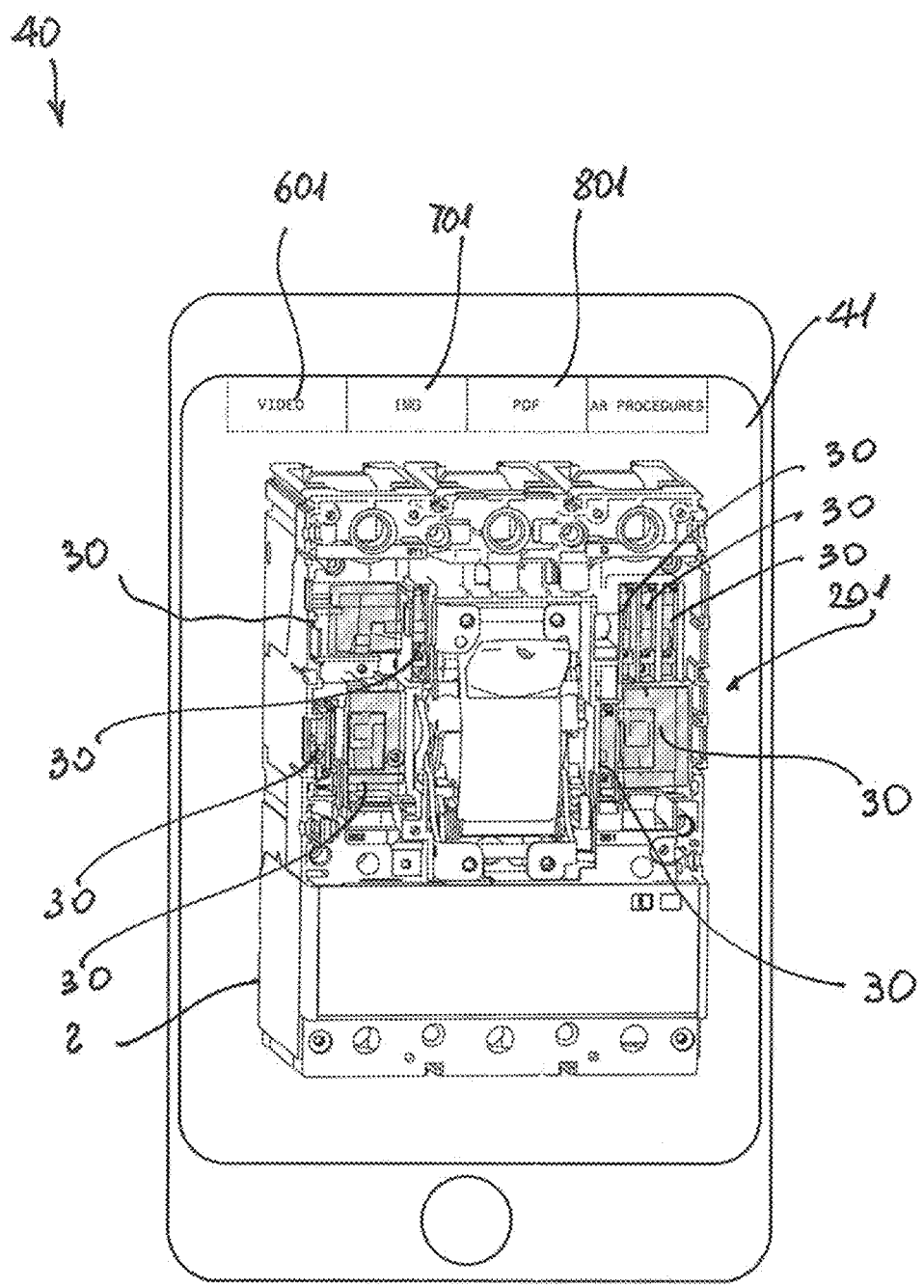

In practice, this can be obtained by superimposing possible mounting locations 30 for one or more accessory devices to the image 201 of said low voltage circuit breaker 2, as shown in FIG. 5.

In typical embodiments of the present invention, this step of displaying in an augmented reality view one or more points of interest of said low voltage switching device 2 can conveniently be carried out by superimposing 2D or 3D views of a number of possible mounting locations 30 for a number of accessory devices 1 to the image 201 of said low voltage switching device 2.

Figure 7:
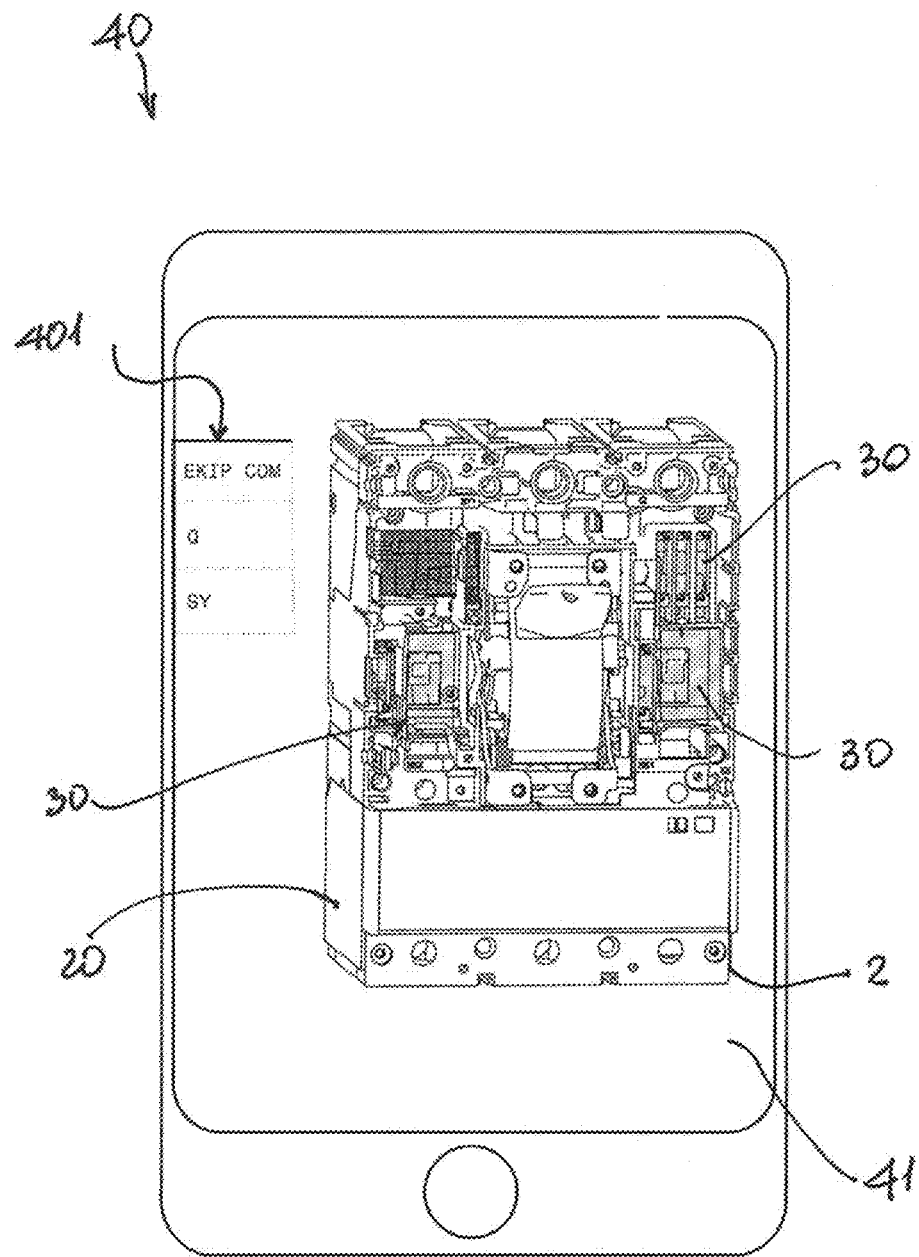

In the next step 400, the method of the present invention foresees displaying information 401 concerning the possible accessory devices 1 that can be installed in said low voltage circuit breaker 2. In practice, a list of all possible accessory devices 1 is presented in an augmented reality view together with the image 201 of the low voltage circuit breaker 2 and its possible mounting locations 30, as shown in FIG. 7.

Figure 6:
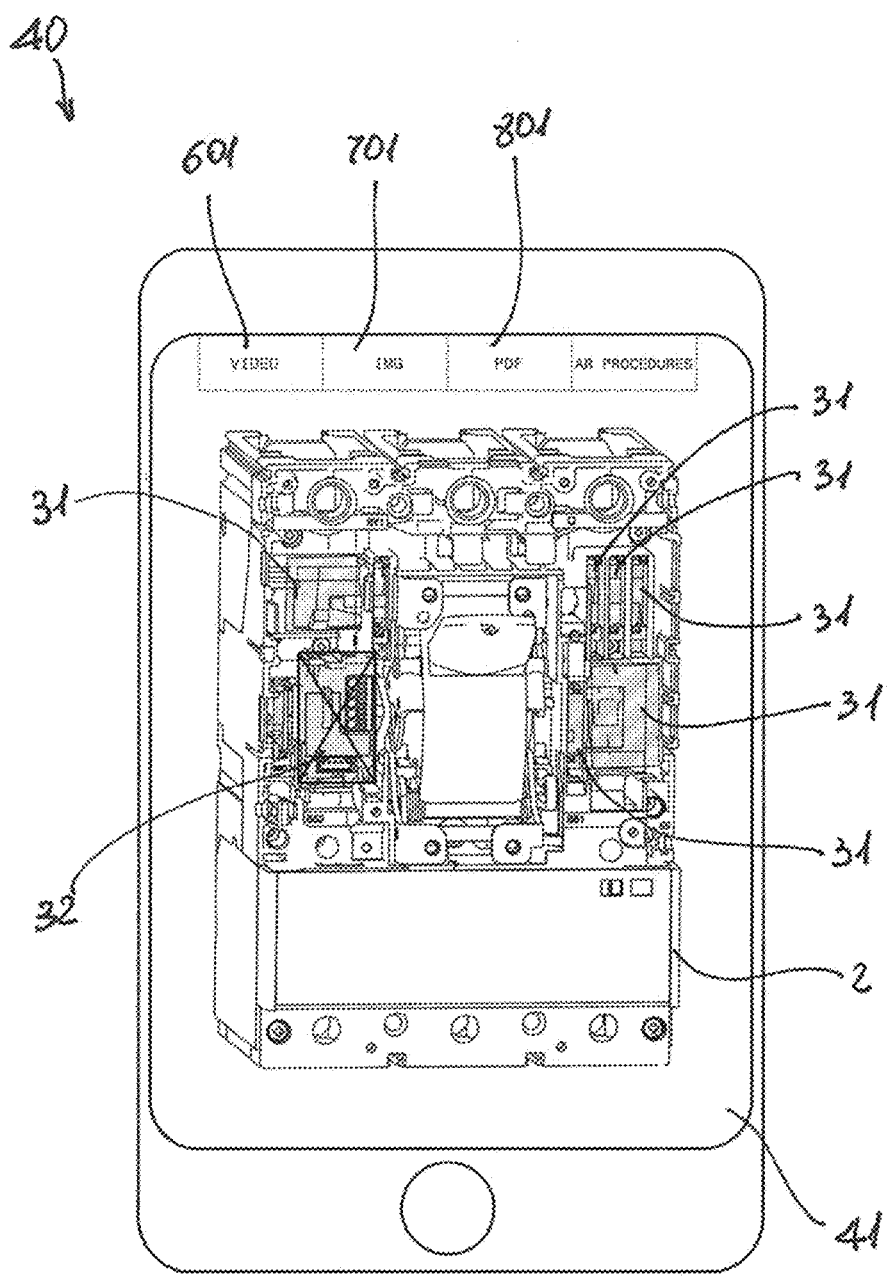

In a preferred embodiment of the method of the present invention, shown in FIG. 6, the step of displaying in an augmented reality view one or more points of interest of said low voltage switching device 2 comprises identifying in an augmented reality view free mounting locations 31 as well as already-occupied mounting locations 32 of said accessory devices 1 in the low voltage circuit breaker 2.

In practice, as shown in FIG. 6, since the mounting location 32 is already occupied by an accessory device, in the augmented reality view the mounting location 32 is represented in a different way with respect to the still free mounting locations 31 of the low voltage circuit breaker 2.

Figure 8:
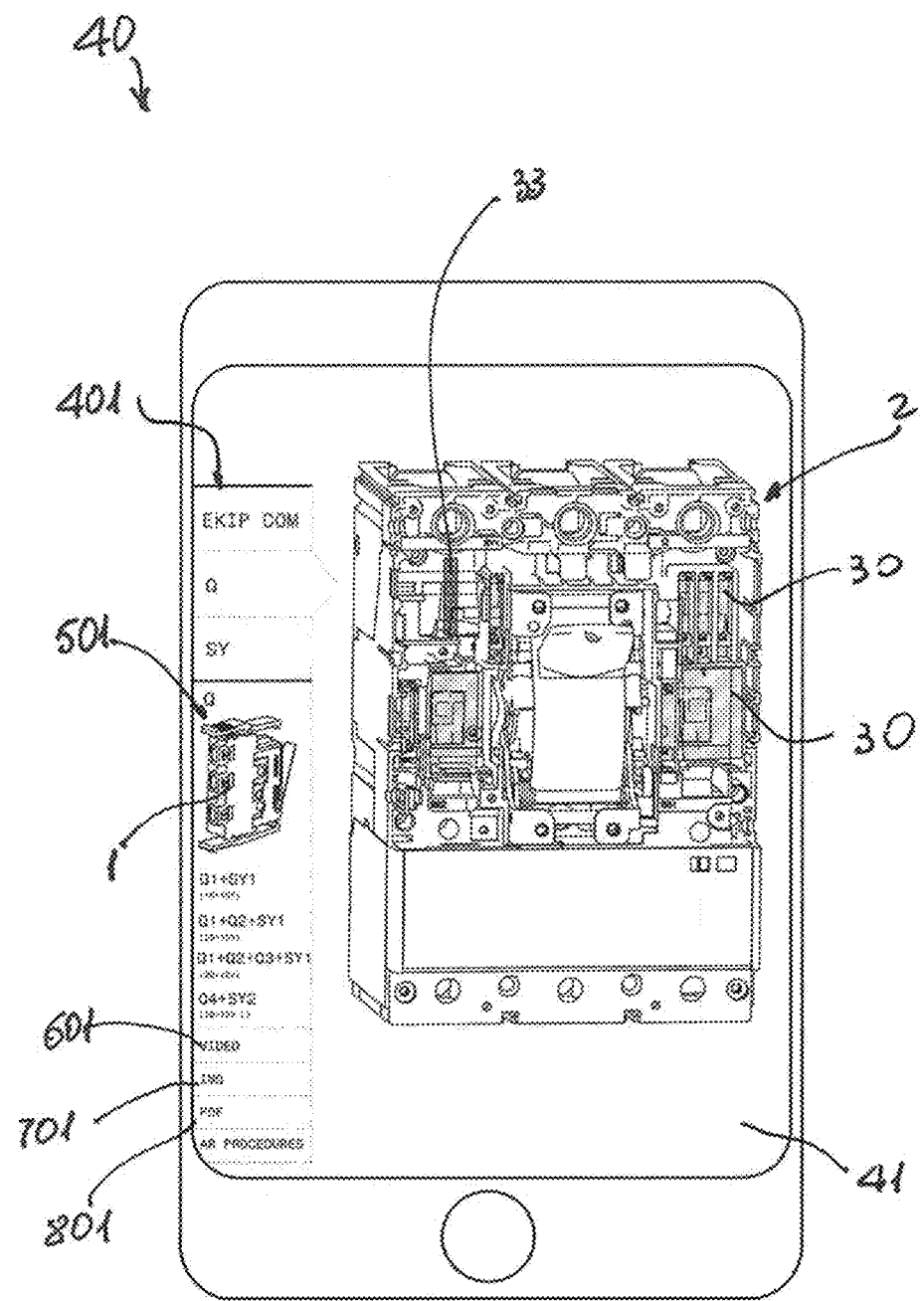
Figure 9:
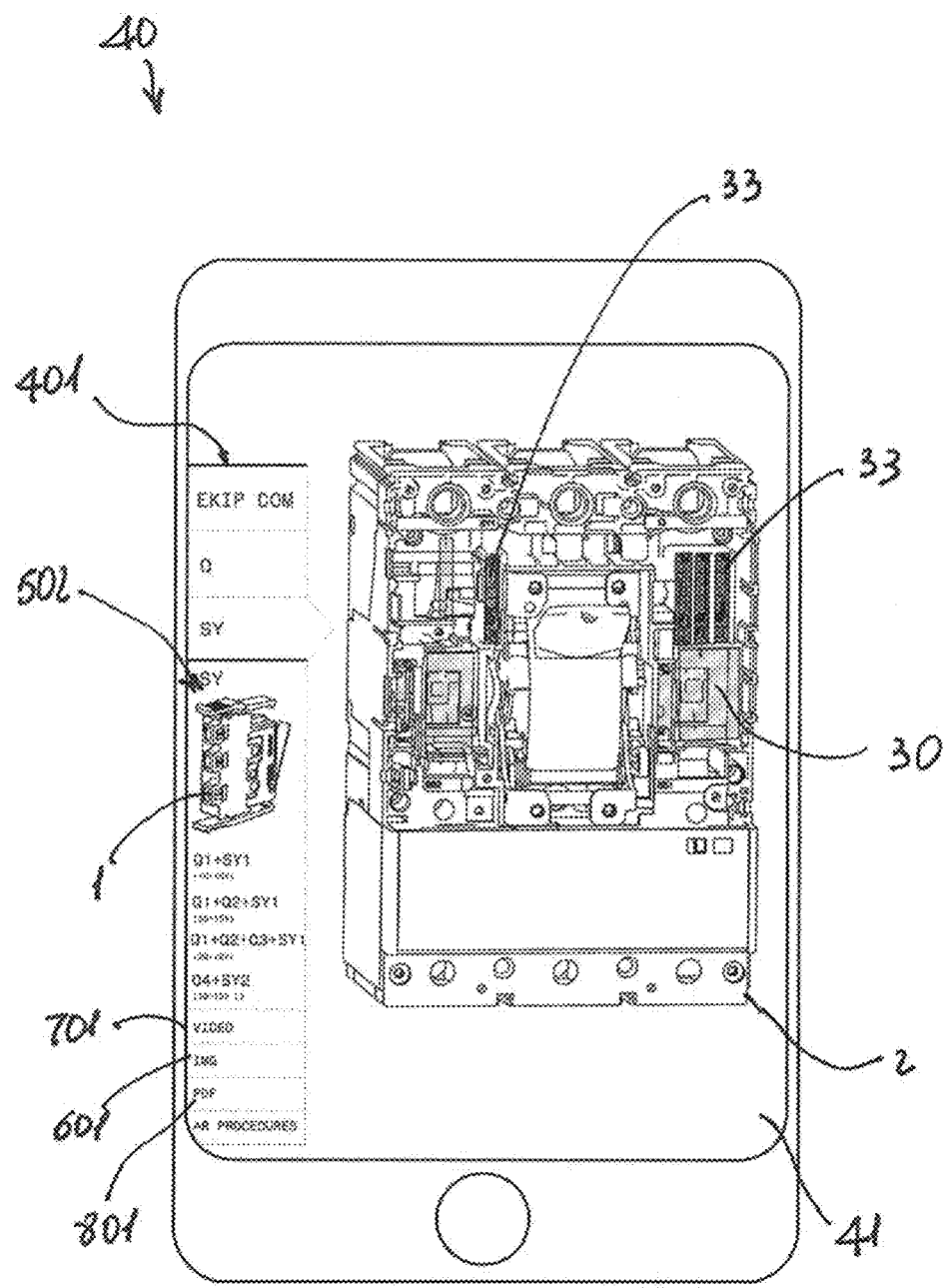
Figure 10:
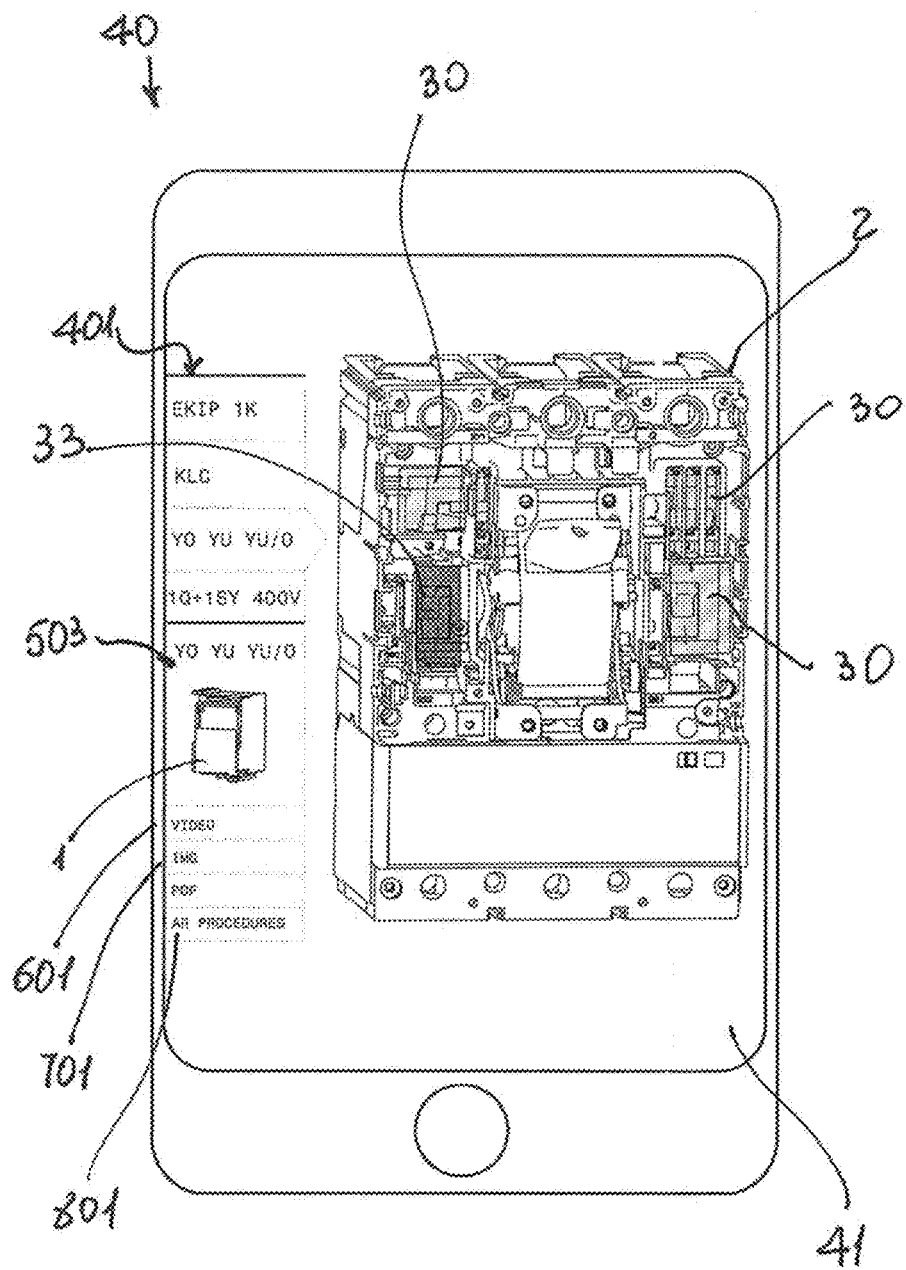

With reference to FIGS. 8-10, the method of the present invention, in its more general embodiment, then foresees the step of selecting one of said possible accessory devices 1 and identifying in an augmented reality view one or more possible mounting locations 33 of the selected accessory device 1 in the low voltage switching device 2.

In practice in the step 500, with reference to FIGS. 8-10, by selecting a desired accessory device 1, it is possible to have on the display an augmented reality view of information 501, 502, 503 concerning the selected accessory device 1, as well as an augmented reality view of one or more suitable mounting locations 33 for the low voltage circuit breaker 2, represented in different way with respect to non-suitable (but still-free) potential mounting locations 30.

It is worth noting that the method for guiding installation of an accessory device 1 in a low voltage switching device 2 according to the present invention also allows displaying a plurality of combinations between accessory devices 1 and corresponding mounting locations 30, so that the user is provided with all possible accessory devices installation alternatives for a given circuit breaker configuration.

In an alternative general embodiment, instead of selecting first the accessory device and then the corresponding mounting location, it is possible to first select one of the possible still-free mounting locations 30 and then identifying in an augmented reality view one or more accessory devices 1 which can be installed in the selected mounting location 30.

In other words, with the method of the present invention it is possible to first select one of said possible accessory devices 1 and identify one or more possible mounting locations 30 for it, and then select among these latter the most suitable mounting locations 30, so as to have the desired combination of accessory device 1 and mounting location 30.

Alternatively, it is possible to first select one of said possible mounting locations 30 and identify one or more accessory devices 1 installable in it, and select among these latter the most suitable accessory device 1, so as to have again the desired combination of accessory device 1 and mounting location 30.

Figure 11:
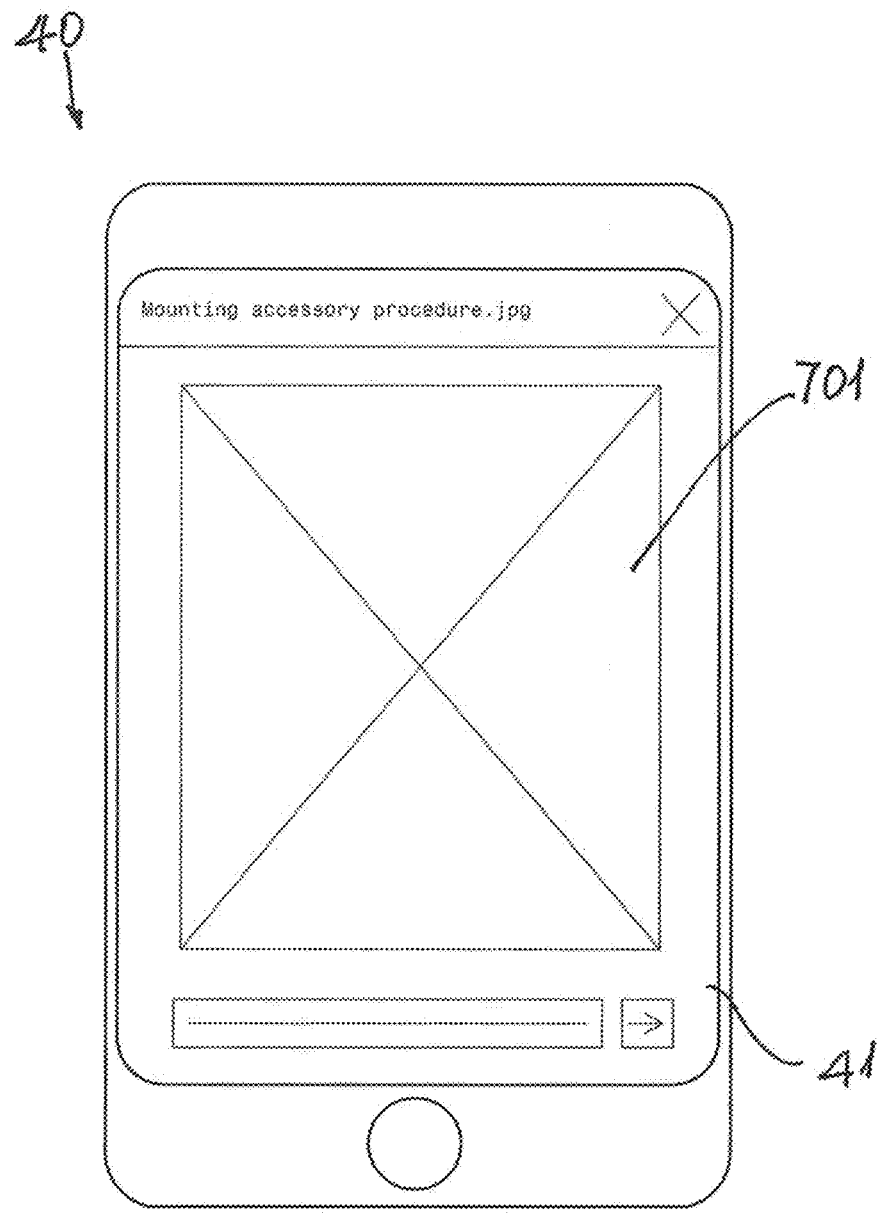
Figure 12:
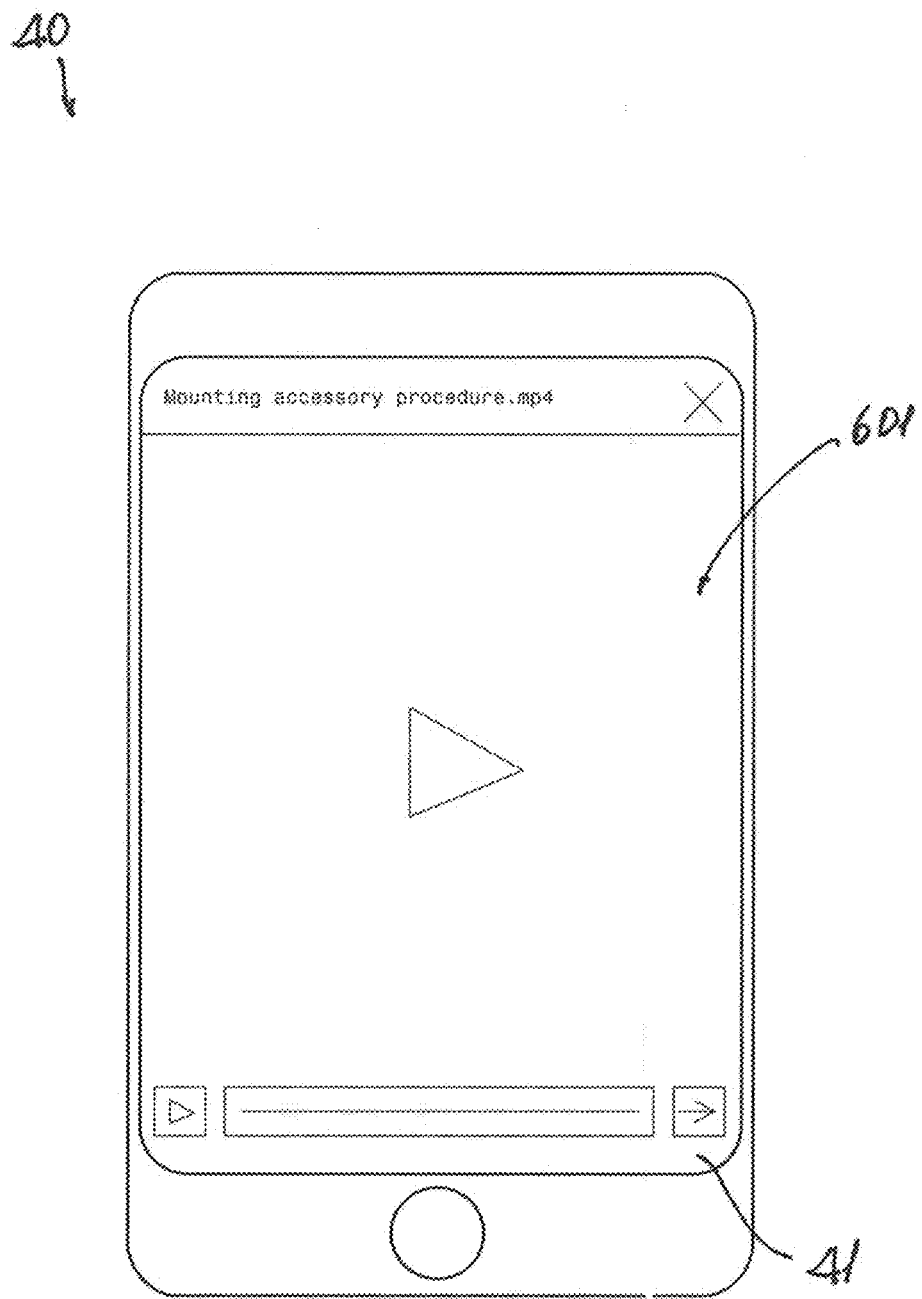
Figure 13:
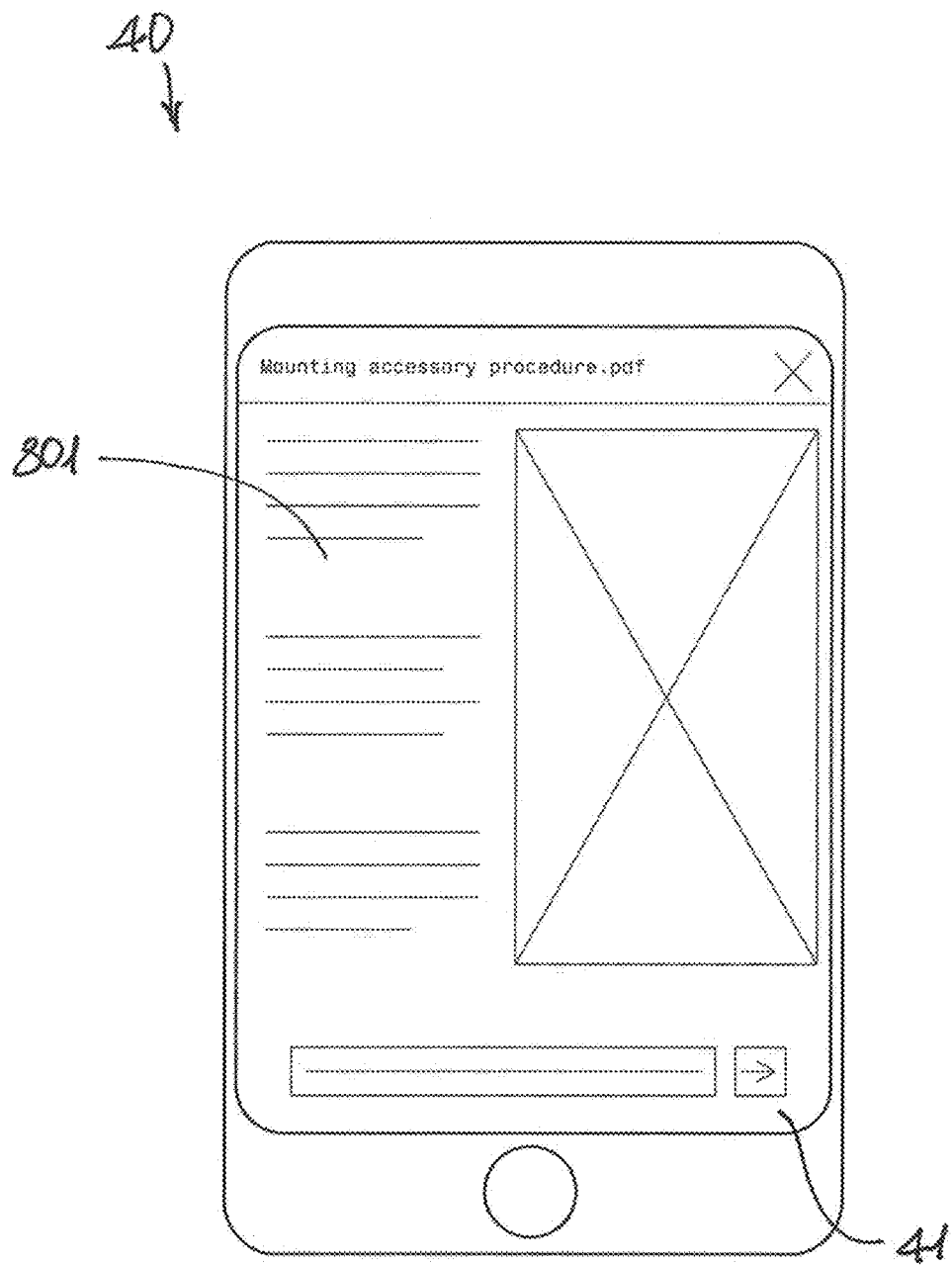
Figure 14:
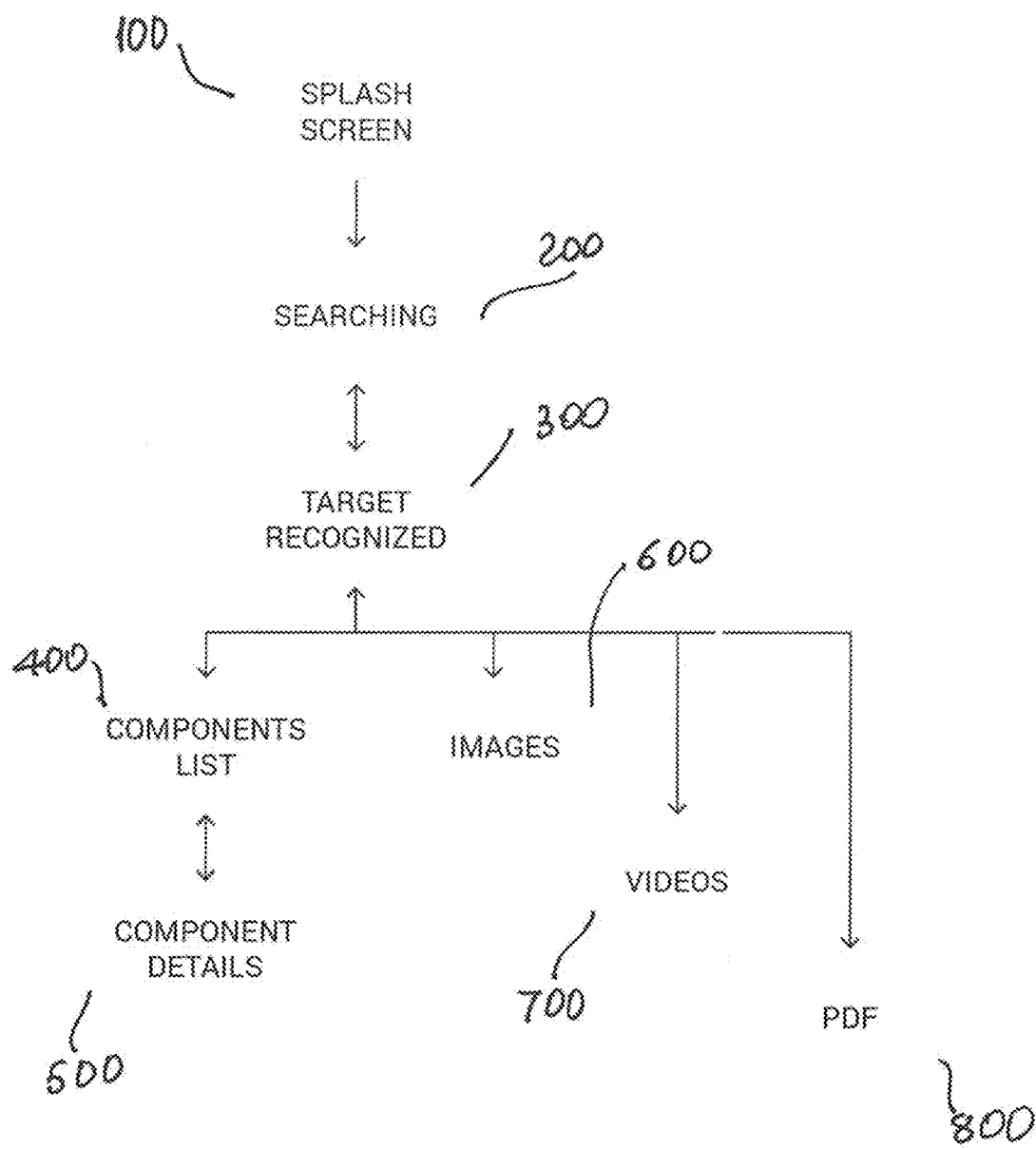
FIG. 14 is a first flow chart of the method of the present invention.
Figure 15:
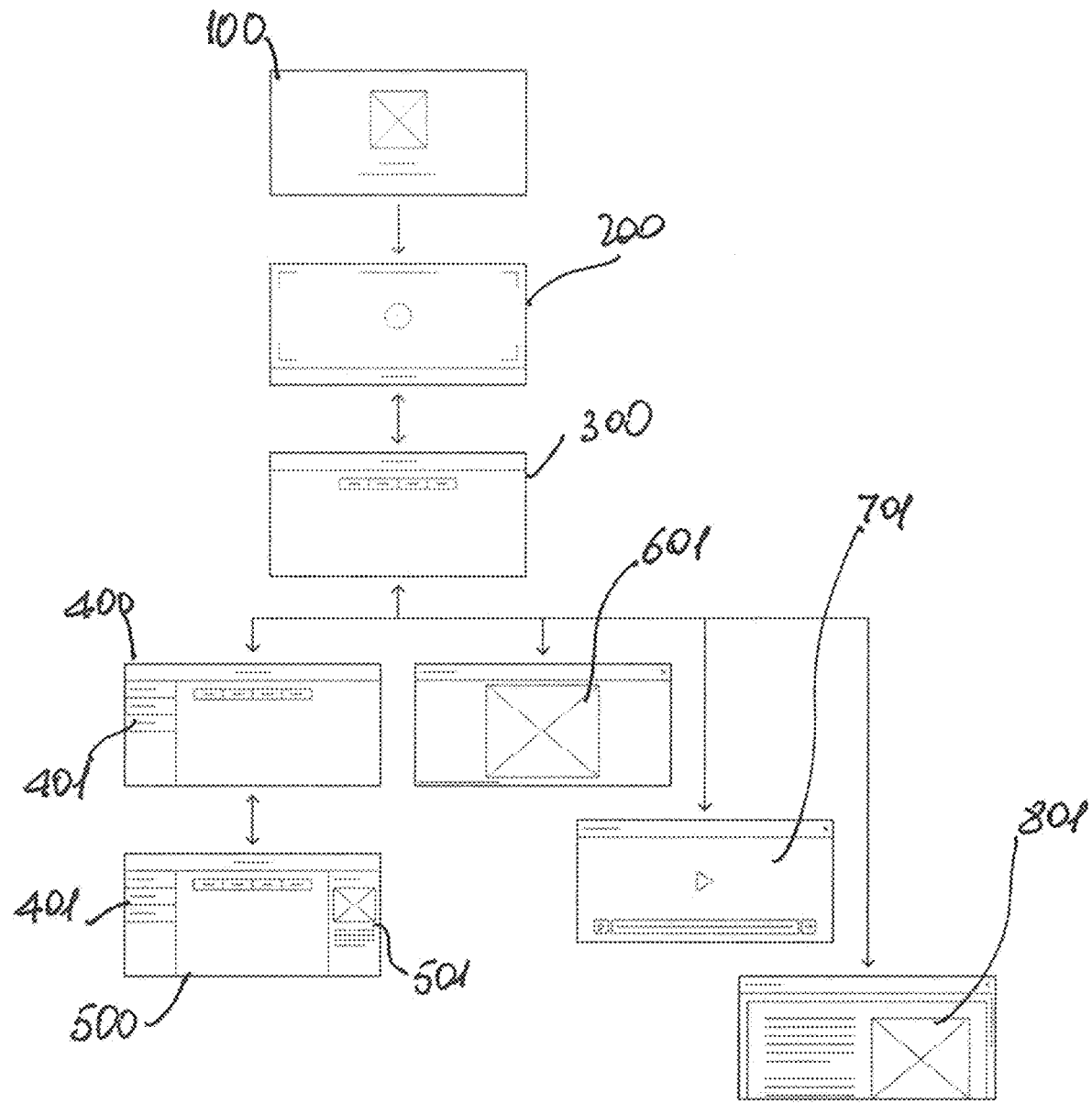
FIG. 15 is a second flow chart of the method of the present invention.

As shown in FIGS. 11-13, in a final step, the method for guiding installation of an accessory device 1 in a low voltage switching device 2 according to the present invention comprises the selection of way of displaying information 601, 701, 801 concerning a mounting procedure for the selected accessory device 1 in the selected mounting location 30 of the low voltage switching device 2.

As shown in the above-mentioned figures for a chosen combination of accessory device 1 and mounting location 30 the user can select how to display the corresponding mounting instructions 601, 701, 801, e.g., with a video or images or a PDF file.

It is clear from the above that the method of the present invention allows solving the previously underlined technical problems.

Indeed, with the method of the present invention the installation procedures of accessory devices in low voltage switches are greatly simplified and it is easy to provide a low voltage switch with the desired accessory devices.

Moreover, the assembly times, as well as possible mistakes by an operator during the assembly of an accessory device inside the casing of a low voltage switch, are reduced.

Also, an operator can easily identify the mounting locations of accessory devices inside the casing of the low voltage switch and to match them with one or more corresponding specific accessory devices, without any need to provide identification signs/colors on the mounting location of the low voltage switch.

Several variations can be made to the method for guiding installation of an accessory device in a low voltage switching device thus conceived, all falling within the scope of the attached claims. In practice, the materials used and the contingent dimensions and shapes can be any, according to requirements and to the state of the art.

The invention claimed is:

1. A method performed by a guided mounting system including an image acquisition device, a display, and a processing system configured to execute a guided mounting program for guiding installation of an accessory device in a voltage switching device having one or more mounting locations for one or more accessory devices, the method comprising:
    acquiring an image of the voltage switching device utilizing the image acquisition device;
    displaying the image on the display;
    identifying the voltage switching device;
    displaying, on the display, in an augmented reality view, one or more points of interest of the voltage switching device by superimposing possible accessory device mounting locations to the image of the voltage switching device;
    displaying, on the display, information concerning possible accessory devices installable in the voltage switching device;
    selecting one of the possible accessory devices and identifying in the augmented reality view on the display, one or more possible mounting locations of the selected accessory device in the voltage switching device or selecting one of the possible accessory device mounting locations and identifying in the augmented reality view on the display, the one or more accessory devices installable in the selected mounting location; and
    displaying, on the display, information concerning a mounting procedure of the selected accessory device in the selected mounting location of the voltage switching device.

2. The method of claim 1, wherein the processing system comprises a processor and a memory device storing the guided mounting program for execution by the processor and data concerning the voltage switching device and the one or more accessory devices usable by the guided mounting program.

3. The method of claim 1, wherein identifying the voltage switching device comprises identifying and tracking the voltage switching device in case of a relative movement between the voltage switching device and the image acquisition device.

4. The method of claim 1, wherein displaying in the augmented reality view the one or more points of interest of the voltage switching device comprises superimposing 2D or 3D views of the possible accessory device mounting locations to the image of the voltage switching device.

5. The method of claim 1, wherein displaying in the augmented reality view the one or more points of interest of the voltage switching device comprises identifying in the augmented reality view free mounting locations and/or already-occupied mounting locations of the accessory device in the voltage switching device.

6. The method of claim 1, wherein selecting one of the possible accessory devices and identifying the one or more possible mounting locations of the selected accessory device in the voltage switching device further comprises selecting a desired mounting location for the selected accessory device.

7. The method of claim 1, wherein selecting one of the possible accessory device mounting locations and identifying the one or more accessory devices installable in the selected mounting location further comprises selecting a desired accessory device for the selected mounting location.

8. The method of claim 1, further comprising displaying, on the display, information concerning the selected accessory device.

9. The method of claim 1, further comprising displaying a plurality of combinations between the possible accessory devices and corresponding mounting locations.

10. The method of claim 1, further comprising selecting a method of displaying the information concerning the mounting procedure of the selected accessory device in the selected mounting location of the voltage switching device.

11. The method of claim 2, wherein identifying the voltage switching device comprises identifying and tracking the voltage switching device in case of a relative movement between the voltage switching device and the image acquisition device.

12. The method of claim 11, wherein displaying in the augmented reality view the one or more points of interest of the voltage switching device comprises superimposing 2D or 3D views of the possible accessory device mounting locations to the image of the voltage switching device.

13. The method of claim 12, wherein displaying in the augmented reality view the one or more points of interest of the voltage switching device comprises identifying in the augmented reality view free mounting locations and/or already-occupied mounting locations of the accessory device in the voltage switching device.

14. The method of claim 13, wherein selecting one of the possible accessory devices and identifying the one or more possible mounting locations of the selected accessory device in the voltage switching device further comprises selecting a desired mounting location for the selected accessory device.

15. The method of claim 14, wherein selecting one of the possible accessory device mounting locations and identifying the one or more accessory devices installable in the selected mounting location further comprises selecting a desired accessory device for the selected mounting location.

16. The method of claim 15, further comprising displaying, on the display, information concerning the selected accessory device.

17. The method of claim 16, further comprising displaying, on the display, a plurality of combinations between the possible accessory devices and corresponding mounting locations.

18. The method of claim 17, further comprising selecting a method of displaying the information concerning the selected accessory device in the selected mounting location of the voltage switching device.

19. The method of claim 13, wherein selecting one of the possible accessory device mounting locations and identifying the one or more accessory devices installable in the selected mounting location further comprises selecting a desired accessory device for the selected mounting location.

* * * * *